(No Model.) 2 Sheets—Sheet 1.

L. M. MEDLIN.
TRACTION ENGINE.

No. 491,846. Patented Feb. 14, 1893.

WITNESSES:
Chas. Nida.
C. Sedgwick.

INVENTOR
L. M. Medlin
BY
Munn & Co.
ATTORNEYS.

(No Model.) 2 Sheets—Sheet 2.

L. M. MEDLIN.
TRACTION ENGINE.

No. 491,846. Patented Feb. 14, 1893.

WITNESSES:
Chas. Nida.
C. Sedgwick

INVENTOR
L. M. Medlin
BY
Munn & Co.
ATTORNEYS.

UNITED STATES PATENT OFFICE.

LOGAN M. MEDLIN, OF LATHAM, MISSOURI.

TRACTION-ENGINE.

SPECIFICATION forming part of Letters Patent No. 491,846, dated February 14, 1893.

Application filed April 14, 1892. Serial No. 429,140. (No model.)

*To all whom it may concern:*

Be it known that I, LOGAN M. MEDLIN, of Latham, in the county of Moniteau and State of Missouri, have invented a new and Improved Traction-Engine, of which the following is a full, clear, and exact description.

The object of the invention is to provide a new and improved traction engine, which is simple and durable in construction and arranged to impart power to all four wheels simultaneously, at the same time permitting steering of the engine at the front wheels.

The invention consists of certain parts and details and combinations of the same, as will be hereinafter described and claimed.

Reference is to be had to the accompanying drawings forming a part of this specification, in which similar letters of reference indicate corresponding parts in all the figures.

Figure 1:
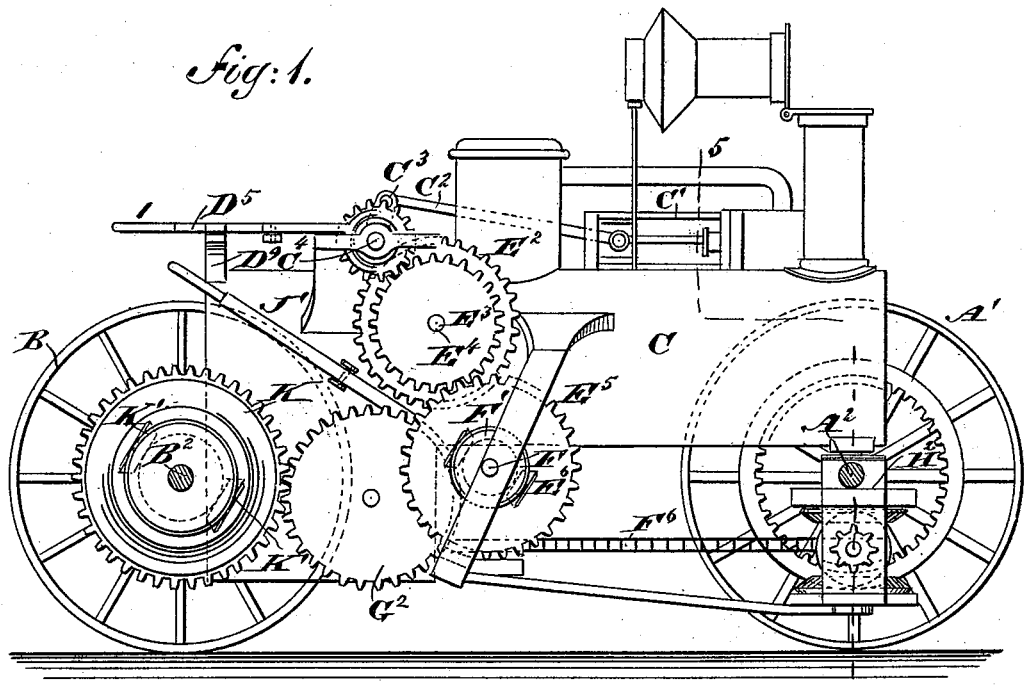
Figure 2:
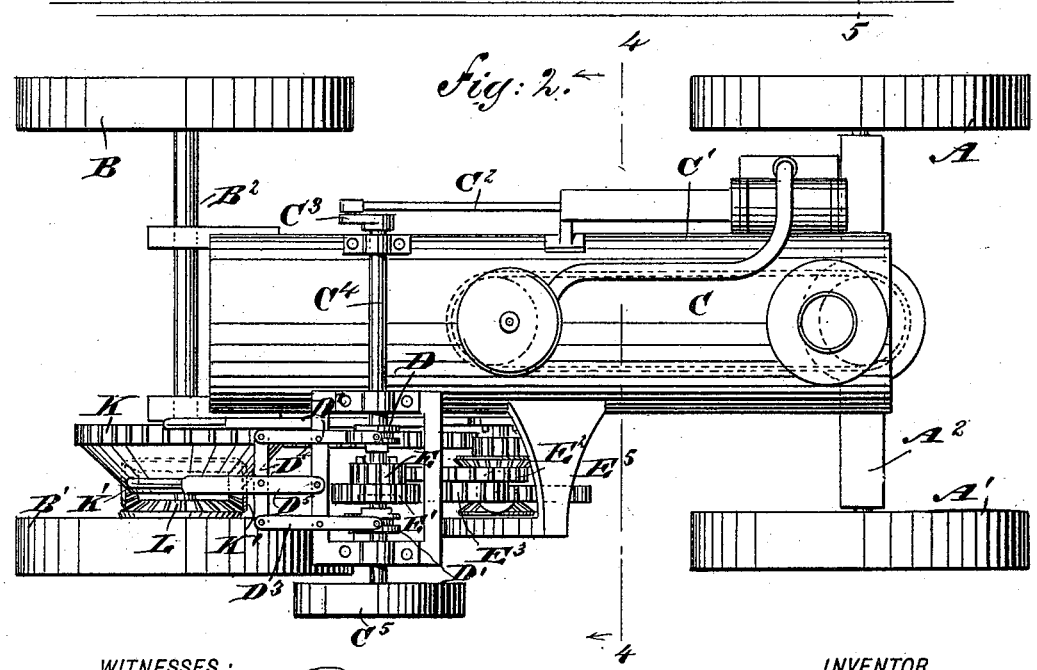
Figure 3:
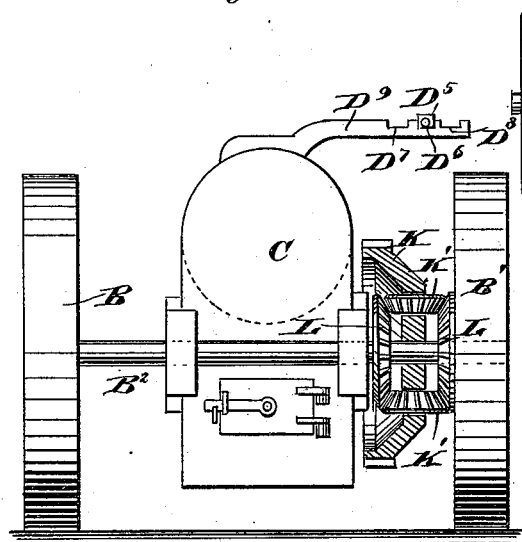
Figure 4:
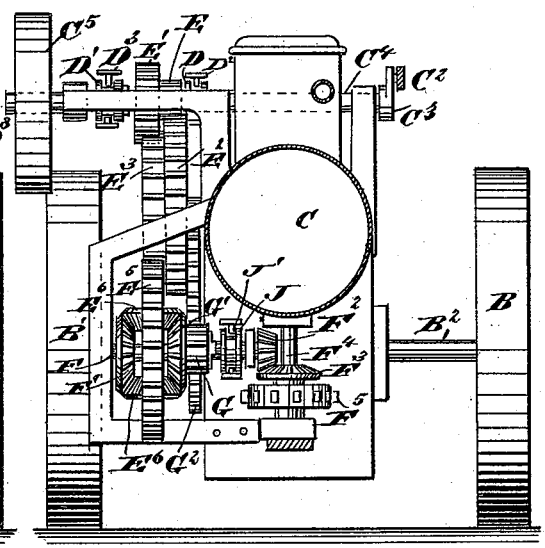
Figure 5:
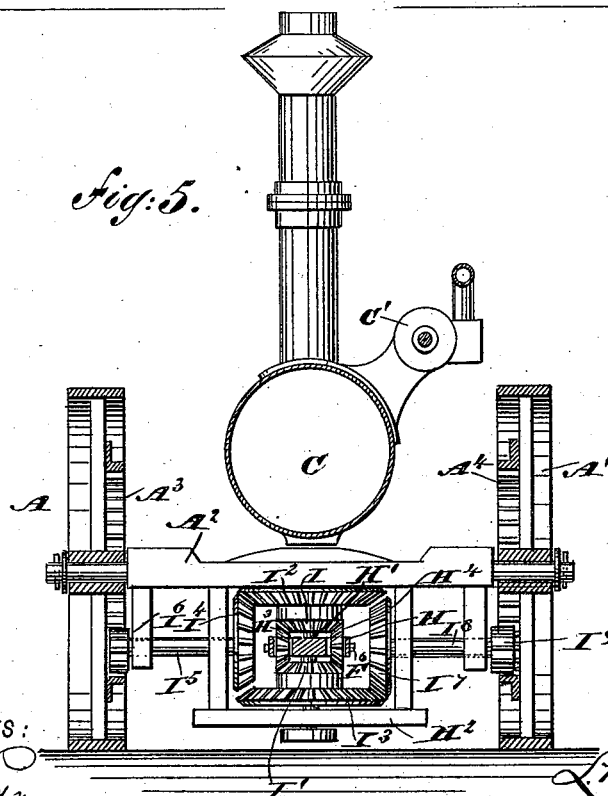

Figure 1 is a side elevation of the improvement with the wheels on one side removed; Fig. 2 is a plan view of the improvement; Fig. 3 is an end view of the improvement with parts in section; Fig. 4 is a transverse section of the improvement on the line 4—4 of Fig. 2 looking rearward; and Fig. 5 is a similar view of the same on the line 5—5 of Fig. 1, looking forward.

The improved traction engine is provided with the front wheels A, A', mounted to turn on the axle $A^2$, and with the rear wheels B, B', mounted on the rear axle $B^2$, which, with the front axle $A^2$ supports the boiler C, in the usual manner.

On the boiler C is mounted the engine C', of any approved construction and connected by its pitman $C^2$, with the crank arm $C^3$, attached to the main driving shaft $C^4$, provided at one outer end with a pulley $C^5$, for transmitting the rotary motion of the said shaft $C^4$ to the other machinery to be driven by the traction engine. The forward motion given to the traction engine, is obtained by a mechanism presently to be described and operated from and connected with the said main driving shaft $C^4$.

On the shaft $C^4$ are held by keys, the clutches D and D' mounted to slide transversely and adapted to be thrown in mesh with similar clutches formed on the gear wheels E and E' respectively mounted to rotate loosely on the said shaft $C^4$ and located between the two clutches D and D', as plainly illustrated in Fig. 2. The clutches D and D' are connected with shifting levers $D^2$ and $D^3$ respectively, pivoted on a suitable framework attached to the boiler C, the outer ends of the said levers being connected with each other by a link $D^4$ pivotally connected with a hand lever $D^5$ having its fulcrum midway between the fulcrums of the two shifting levers $D^2$ and $D^3$.

The handle end of the lever $D^5$ is adapted to be engaged with notches $D^6$, $D^7$ and $D^8$ arranged transversely and alongside each other on an arm $D^9$ projecting from the boiler C, as plainly illustrated in Fig. 3. When the lever $D^5$ engages the middle notch $D^6$ then the two clutches D and D' are both held out of contact with the respective clutches on the gear wheels E and E'. When the lever $D^5$ is shifted to the left into the notch $D^7$ then the clutch D is moved in engagement with the smaller gear wheel E so that the latter rotates with the shaft $C^4$. When the lever $D^5$ is moved outwardly in engagement with the notch $D^8$ then the other clutch D' is thrown in mesh with the clutch on the large gear wheel E', so that the latter rotates with the shaft $C^4$ while the other clutch D is disengaged from the small gear wheel E and the latter consequently is loose on the shaft. The gear wheels E and E' are in mesh with the gear wheels $E^2$ and $E^3$ respectively, of which the latter is secured the face of the gear wheel $E^2$ and both are mounted to rotate loosely on the shaft or stud $E^4$ extending transversely and mounted to turn in suitable bearings on the main frame. The smaller gear wheel $E^3$ is in mesh with a gear wheel $E^5$, mounted to rotate loosely on the shaft F extending transversely and mounted to turn in suitable bearings on the main frame, the said shaft extending under the boiler C, as plainly illustrated in Fig. 4.

In the web of the gear wheel $E^5$ are mounted the transversely-extending bevel pinions $E^6$, the axes of which extend radially to the shaft F. The bevel pinions $E^6$ are in mesh on their outer sides with a bevel gear wheel F' secured on the shaft F, while the inner sides of the said pinions $E^6$ are in mesh with a bevel gear wheel G' formed on the face of a pinion G mounted to rotate loosely on the shaft F which latter is a part of the intermediate compensating gear. The pinion G serves to revolve the rear driven wheels B and B' as hereinafter more fully described, while the bevel gear wheel F' secured on the shaft F serves to rotate the front drive wheels A and A', in the manner presently to be described.

On the inner end of the shaft F is secured a bevel pinion $F^2$ in mesh with a bevel gear wheel $F^3$ secured on a vertically disposed shaft $F^4$ mounted to turn in suitable bearings on the main frame. On the shaft $F^4$ is secured a sprocket wheel $F^5$ over which passes a sprocket chain $F^6$ extending horizontally and forwardly to pass at the front end over a sprocket wheel H mounted to rotate loosely on a shaft H' held in a suitable frame $H^2$ supported from the front axle $A^2$, see Fig. 5.

In the web of the sprocket wheel H are journaled the vertically disposed bevel gear wheels $H^3$ and $H^4$ meshing on top into a bevel gear wheel I mounted to rotate loosely on the shaft H'. The said bevel gear wheels $H^3$ and $H^4$ mesh at their lower ends into a bevel gear wheel I' as plainly shown in Fig. 5. The bevel gear wheel I supports on its top face a large bevel gear wheel $I^2$, and a like bevel gear wheel $I^3$, is secured to the bevel gear wheel I'. The bevel gear wheel $I^2$ meshes into a bevel gear wheel $I^4$ secured on the inner end of a transversely extending shaft $I^5$ mounted to turn in suitable bearings arranged in the frame $H^2$ and in special brackets depending from the front axle $A^2$.

On the outer end of the shaft $I^5$ is secured a pinion $I^6$ in mesh with an internal gear wheel $A^3$ attached to the web of the drive wheel A. The other large gear wheel $I^3$ previously mentioned is in mesh with a bevel gear wheel $I^7$ secured on the inner end of a short shaft $I^8$ mounted in suitable bearings in the frame $H^2$ and in a bracket depending from the front axle $A^2$. The two shafts $I^5$ and $I^8$ are in alignment with each other. The outer end of the shaft $I^8$ is provided with a pinion $I^9$ in mesh with an internal gear wheel $A^4$ attached to the web of the front drive wheel A'. Now, it will be seen that when a rotary motion is given to the shaft $C^4$, and one of the clutches D or D' is in mesh with its respective gear wheel E or E', then motion is imparted to the gear wheels $E^2$ and $E^3$, the latter rotating with more or less speed according to which gear wheel E or E' is engaged by its respective clutch D or D'. The rotary motion of the gear wheels $E^2$ and $E^3$ is transmitted by the latter to the gear wheel $E^5$ which, by the bevel pinions $E^6$, imparts a rotary motion to the bevel gear wheel F' secured on the shaft F so that the latter is likewise rotated. The rotary motion of the shaft F is transmitted by the bevel pinion $F^2$ to the bevel gear wheel $F^3$ whereby the vertical shaft $F^4$ is revolved and its motion is transmitted by the sprocket wheel $F^5$, and the sprocket chain $F^6$ to the sprocket wheel H. The rotary motion of the latter is transmitted by the wheels $H^3$ and $H^4$ to the bevel gear wheels I and I' and consequently to the large bevel gear wheels $I^2$ and $I^3$ attached to the said bevel gear wheels I and I' respectively. The rotary motion of the large bevel gear wheel $I^2$ is transmitted to the bevel gear wheel $I^4$ secured on the shaft $I^5$ so that the latter revolves and by the pinion $I^6$ meshing into the internal gear wheel $A^3$ rotates the main drive wheel A. In a like manner the motion of the gear wheel $I^3$ is transmitted to the gear wheel $I^7$ secured on the shaft $I^8$ so that the latter is revolved and by its pinion $I^9$ imparts rotary motion to the internal gear wheel $A^4$ and consequently to the other front drive wheel A'. It will be seen that the gear wheel connection with the front wheels A, A', at the front axle is compensating so that a uniform power admitting of a differential motion is given to the said wheels, at the same time due allowance being made for any slip of either of the said wheels.

The connection of the pinion G previously mentioned with the rear drive wheels B, B' is as follows: The pinion G is adapted to be directly connected with the shaft F and for this purpose, a clutch J is mounted to slide on and to turn with the shaft F and is adapted to be thrown in mesh with a similar clutch on the inner face of the said pinion, as will be readily understood by reference to Fig. 4. The clutch J is under the control of the operator by means of the shifting lever J', extending rearwardly as illustrated in Figs. 1 and 4. Normally the clutch J is out of mesh with the pinion G so that the latter rotates loosely on the shaft F. The pinion G meshes into an intermediate gear wheel $G^2$ in mesh with a large bevel gear wheel K mounted to rotate loosely on the rear axle $B^2$ which latter is mounted to revolve and rigidly carries the rear drive wheels B and B'. In the web of the large gear wheel K are journaled the bevel pinions K', the axes of which extend radially to the said shaft $B^2$ and the opposite sides of the said pinions mesh in bevel gear wheels L secured on the shaft $B^2$. Now, when the gear wheel $E^5$ is rotated as above described, the bevel pinions $E^6$ transmit a rotary motion to the gear wheel G', and as the latter is secured to the pinion G, a rotary motion is transmitted to the intermediate gear wheel $G^2$ which by meshing into the gear wheel K rotates the latter, and the pinions K' held in the web of the gear wheel K transmit a rotary motion to the bevel gear wheels L on the axle shaft $B^2$. Thus a rotary motion is transmitted to the rear axle shaft and consequently to the rear wheels B, B' at the same time that a like motion is given to the front drive wheels A, A'. It will be understood that by imparting rotary motion simultaneously to the four drive wheels, the engine can be readily propelled at a high rate of speed, and without any loss or waste of power. By the arrangement shown and described, the power of the engine C' is equally transmitted to the said drive wheels, so that the latter are not liable to slip, especially if the load be equally distributed on the four drive wheels and they rotate simultaneously.

It will be seen that with this improvement, the front drive wheels A, A' are a positive guide as they will pull the engine in any direction in which the said wheels are guided, it being understood that if the rear wheels were only pushing in a straight direction, while the front wheels were thrown at an angle in order to cause the engine to travel around a curve, then the line of push from the rear wheels would be in a different direction to the movement of the front wheels and consequently much power would be wasted, and in many cases would utterly fail to guide on smooth ground. As the front wheels are revolved they pull and will positively carry the engine in the direction in which they are guided.

By using the compensating gear wheel arrangement intermediate of the rear axle and the front axle, as described the power developed by the engine is economically used and compensates for any slip difference in the motion of the drive wheels. When the traction engine is used for transmitting power to other machinery then the lever $D^5$ is in the middle position, as shown in Figs. 2 and 3, whereby the clutches D and D' are out of mesh with their reciprocating gear wheels E, E' and consequently the latter remain at a standstill as they are loosely mounted on the shaft $C^4$. The rotary motion of the latter is then transmitted by the pulley $C^5$ to the machinery to be driven.

To more fully illustrate the workings of the compensating device, I desire to state that in turning an engine on a curve for instance having a diameter of fifty feet, the outside wheel will travel one hundred and fifty feet, omitting fractions, and using a seven foot axle, the inside wheel travels only one hundred and eight feet. The outside wheel has of course to travel farther and must consequently run proprotionately faster. This is accomplished by the compensating device above described which admits of the differential speed in the two wheels, and at the same time gives uniform power to each of them. In a like manner the rear wheels draw in on a shorter curve than the front ones, and as a natural consequence travel at a different rate of speed than the front ones. By the intermediate compensating device above described, the difference in speed of the front and rear wheels is compensated for.

Having thus described my invention what I claim as new, and desire to secure by Letters Patent, is—

1. The combination with the main driving shaft having a small loose gear E and a larger loose gear E', and clutches for connecting either gear with the shaft, of the large and small connected gear wheels $E^2$ $E^3$ meshing with gears E E' respectively, a transverse shaft F having a gear $E^5$ turning loosely thereon and meshing with gear $E^3$, bevel pinions mounted in the web of gear $E^5$ and meshing at their outer sides with a gear wheel F' secured to shaft F, and at their opposite sides meshing with a gear G' on the face of a pinion G turning loosely on shaft F, gearing connecting the pinion G with the rear traction wheels and gearing connecting the gear wheel F' with the front traction wheels, substantially as set forth.

2. The combination with the front axle and the wheels turning on the ends thereof and having gear wheels $A^3$ $A^4$, of two short shafts $I^5$ $I^8$ below and parallel with the axes of the wheels and having pinions $I^6$ $I^9$ meshing with said wheels $A^3$ $A^4$ and provided at their inner ends with bevel gears $I^4$ $I^7$, a vertical shaft H' provided with an upper and a lower horizontal bevel wheel $I^2$ $I^3$ meshing respectively with wheels $I^4$ $I^7$, and provided on their adjacent faces with smaller bevel gears I I', a horizontally turning toothed wheel having bevel pinions $H^3$ $H^4$ in its web and meshing with the bevel gears I I' and gearing connecting the horizontal toothed wheel with the drive shaft, substantially as set forth.

3. In a traction engine, the combination with a main drive shaft, of short shafts extending transversely and mounted to rotate on the front axle, gearing for connecting the said short shafts with the front drive wheels, a compensating and driving gearing connected with the said short shafts for rotating the same, sprocket wheels and chain connected with the said compensating and driving gearing, and a transversely-extending shaft connected with one of the said sprocket wheels and connected with the main driving shaft, substantially as shown and described.

4. In a traction engine, the combination with a main drive shaft, of short shafts extending transversely and mounted to rotate on the front axle, gearing for connecting the said short shafts with the front drive wheels, a compensating and driving gearing connected with the said short shafts for rotating the same, sprocket wheels and a chain connected with the said compensating and driving gearing, a transversely-extending shaft connected with one of the said sprocket wheels and connected with the main driving shaft, and intermediate mechanism for connecting the said drive shaft with the last mentioned transverse shaft, substantially as shown and described.

5. In a traction engine, the combination with the rear axle shaft carrying the rear wheels, of bevel gear wheels secured on the said axle shaft, a gear wheel mounted to rotate loosely on the said axle shaft and provided in its web with pinions in mesh with the said bevel gear wheels, a gearing connected with the said large gear wheel rotating loosely on the said rear axle shaft, and a main driving shaft connected with the said gearing, substantially as shown and described.

LOGAN M. MEDLIN.

Witnesses:
J. E. MOAR,
WM. TYREE.